US008650928B2

United States Patent
Herbold

(10) Patent No.: US 8,650,928 B2
(45) Date of Patent: Feb. 18, 2014

(54) ACTUATING DEVICE FOR CALIBRATING TORQUE/ANGLE WRENCHES

(75) Inventor: Siegfried Herbold, Wuppertal (DE)

(73) Assignee: Eduard Wille GmbH & Co. KG, Wuppertal (DE)

( * ) Notice: Subject to any disclaimer, the term of this patent is extended or adjusted under 35 U.S.C. 154(b) by 201 days.

(21) Appl. No.: 13/223,890

(22) Filed: Sep. 1, 2011

(65) Prior Publication Data

US 2012/0055228 A1  Mar. 8, 2012

(30) Foreign Application Priority Data

Sep. 3, 2010  (DE) .......................... 10 2010 040 217

(51) Int. Cl.
*G01L 25/00* (2006.01)

(52) U.S. Cl.
USPC ........................................................... 73/1.12

(58) Field of Classification Search
USPC .......... 73/1.09, 1.11, 1.12, 862.045, 862.046, 73/862.08, 862.29, 862.326, 862.6, 73/862.337, 862.338
See application file for complete search history.

(56) References Cited

U.S. PATENT DOCUMENTS

| | | | | |
|---|---|---|---|---|
| 3,643,501 A * | 2/1972 | Pauley | ....................... | 73/862.24 |
| 4,008,773 A * | 2/1977 | Wallace et al. | ............... | 173/181 |
| 6,609,407 B1* | 8/2003 | Tambini | ........................ | 73/1.11 |
| 7,885,780 B2* | 2/2011 | Lucke | ........................... | 702/108 |
| 8,117,887 B2* | 2/2012 | Schwafertz et al. | ........... | 73/1.12 |
| 2002/0078761 A1* | 6/2002 | Meyer | ....................... | 73/862.08 |
| 2008/0141790 A1* | 6/2008 | Schwafertz | ............. | 73/862.325 |
| 2012/0031161 A1* | 2/2012 | Hsieh | ............................. | 73/1.12 |
| 2012/0266693 A1* | 10/2012 | Zhang | ....................... | 73/862.08 |

FOREIGN PATENT DOCUMENTS

| | | |
|---|---|---|
| EP | 1927836 A2 | 6/2008 |
| EP | 2096424 A2 | 9/2009 |
| EP | 2096425 A2 | 9/2009 |

* cited by examiner

*Primary Examiner* — Leonard Chang
*Assistant Examiner* — Natalie Huls
(74) *Attorney, Agent, or Firm* — Kelly & Kelley, LLP

(57) ABSTRACT

An actuating device for calibrating torque/angle wrenches encompassing a torque measuring system, includes at least a means for accommodating the torque/angle wrench, a torque actuator for applying a torque to the torque/angle wrench, and a torque sensor for detecting the torque. Provision is made for a rotation angle measuring system for rotating the torque measuring system in such a manner that a rotation of the torque/angle wrench about a rotation angle can be measured in addition to the measuring of a torque in the torque/angle wrench.

11 Claims, 2 Drawing Sheets

ACTUATING DEVICE FOR CALIBRATING TORQUE/ANGLE WRENCHES

Figure 1:
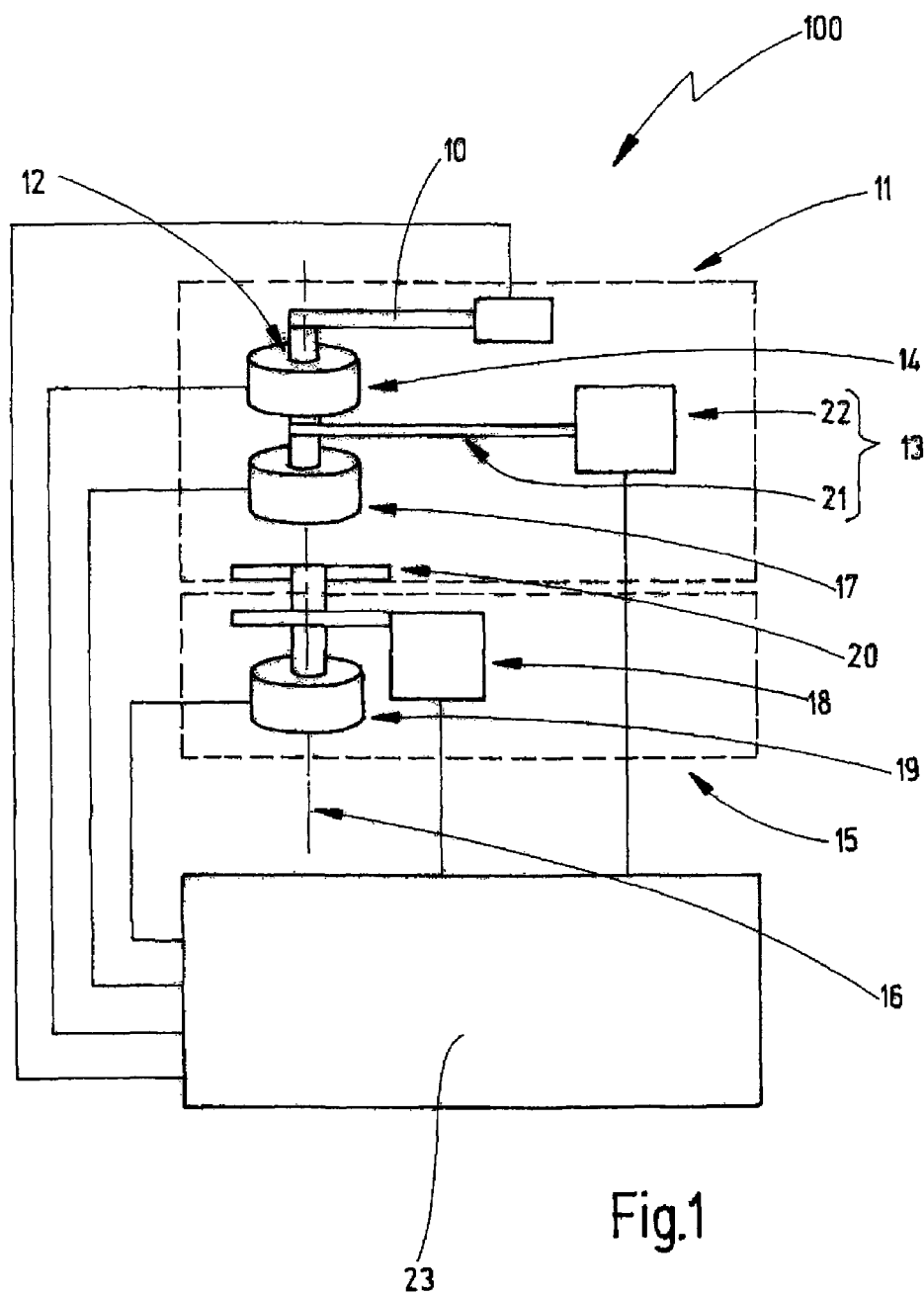

The instant invention relates to an actuating device for calibrating torque wrenches comprising a torque measuring system, which comprises at least one accommodation for accommodating the torque wrench, a torque actuator for applying a torque to the torque wrench and a torque sensor for detecting the torque.

PRIOR ART

An actuating device for testing torque wrenches is known from DE 20 2006 018 352 U1 (corresponds to EP 1 927 836 A2), comprising a support for fastening a torque wrench, which is to be tested. A measuring sensor, which is coupled to the head piece of the torque wrench, which is to be tested, is arranged on the support. The grip of the torque wrench, which is to be tested, is fastened by means of a grip holder, which is arranged on the support. The actuating device encompasses a deflecting mechanism for generating a torque on the headpiece of the torque wrench, which is to be tested.

An actuating device for testing torque wrenches is known from DE 20 2008 002 919 U1 (corresponds to EP 2 096 424 A2), comprising a support for fastening a torque wrench, which is to be tested, as well as a measuring sensor, which is arranged on the support and which is coupled to the headpiece of the torque wrench, which is to be tested. In addition, it comprises a grip holder, which is arranged on the support, for fastening the grip of the torque wrench, which is to be tested, and a deflecting mechanism for generating a torque on the headpiece of the torque wrench, which is to be tested.

An actuating device for calibrating a torque wrenches is known from DE 20 2008 002 913 U1 (corresponds to EP 2 096 425 A2), in which provision is made for a torque measuring system, which comprises an accommodation for accommodating a torque wrench, a torque actuator for applying a torque to the torque wrench and a torque sensor for detecting the torque. Torque wrenches can encompass digitally designed torque sensors, and data interfaces are known, for scanning a torque measured in the torque wrench via a communication unit and to store it, for example. The torque wrench is inserted with a head piece into the accommodation, which can be embodied as a square accommodation, for example. In the event that the torque encompasses a square exchangeable head, this exchangeable head can be inserted into the square accommodation. On the end side, the torque wrench encompasses a wrench grip, which can be clamped in a tool clamping device. In the event that a torque is introduced into the headpiece of the torque wrench via the accommodation, the torque is supported via the piston and the wrench grip on the end side, in that the wrench grip is accommodated in a tool clamping device. The tool clamping device is mounted on the measuring table, on which the torque actuator for applying the torque to the torque wrench is also arranged. The result is a closed torque circuit and the torque actuator introduces the torque via the accommodation into the headpiece of the torque wrench, wherein the torque actuator is mechanically supported against the measuring table or is accommodated therein, respectively. As a counter moment, the torque wrench is supported via the wrench grip and the tool clamping device is also supported via the measuring table. This results in a closed torque circuit, wherein a reference is provided via the torque sensor, so that a device for electronically measuring the torque, which is arranged in the torque wrench, can be calibrated.

Disadvantageously, a screw connection, which can be established by means of a torque wrench, cannot be reproduced or can only be reproduced with a large effort and with a high measuring inaccuracy by means of the known actuating device for calibrating torque wrenches.

It is thus the object of the instant invention to create an actuating device for calibrating torque/angle wrenches, by means of which any screw connections can be reproduced, which can be established by means of the torque/angle wrench.

This object is solved on the basis of an actuating device for calibrating torque/angle wrenches according to the preamble of claim 1 in combination with the characterizing features. Advantageous further developments of the invention are specified in the dependent claims.

DISCLOSURE OF THE INVENTION

The advantage that the torque actuator and the rotation angle actuator can be adjusted by means of a motor in a continuous manner independent of one another is attained. With this, any torque/rotation angle course can be created so as to be capable of being repeated. In particular, fixed screw connections can be simulated and the inherent bending of the torque/angle wrench can be determined in a simple manner.

The invention is thereby based on the idea that the rotation angle measuring system rotates the torque measuring system as a closed unit. In response to the initiation of the rotary motion into the torque measuring system, no torques must be overcome, so that only the rotary moment of inertia and, if applicable, the friction in an accommodation support, must be overcome for the rotation of the torque measuring system. Due to the closed torque circuit, which runs at least via the torque/angle wrench, via the accommodation of the torque/angle wrench via the torque sensor as well as the torque-generating torque actuator, the torque measuring is not disturbed by the activation of the rotation angle measuring system and the torque, which is introduced into the torque/angle wrench, is not influenced by the rotation of the torque measuring system.

The advantage that the torque actuator and the rotation angle actuator can be adjusted by means of a motor in a continuous manner independent on one another is attained. With this, any torque/rotation angle course can be created so as to be capable of being repeated. In particular, fixed screw connections can be simulated and the inherent bending of the torque/angle wrench can be determined in a simple manner.

Provision can be made in a particularly advantageous manner for an axis of rotation, about which the torque measuring system can be rotated. In the case of the system according to the invention, the axis of rotation can thereby advantageously coincide with the axis, about which the torque is introduced into the torque/angle wrench by means of the torque actuator. The accommodation for accommodating the torque/angle wrench is consequently located in the axis of rotation. The rotation of the torque measuring system about the axis of rotation can at least be a full circle (360°) and can be capable of being measured.

To measure the rotation of the torque measuring system, said system in particular encompasses a rotation angle sensor. The torque/angle wrench is thereby accommodated in a rotation-free manner with reference to the torque measuring system. However, the torque/angle wrench is also rotated by means of the rotation of the entire torque measuring system about the axis of rotation, and the rotation of the torque/angle wrench takes place in the same manner as in response to the rotation of a screw or a screw nut. The device for electronically measuring the rotation angle in the torque/angle wrench measures the rotation introduced into the torque/angle wrench and the device can be calibrated via the reference of the rotation angle sensor in the torque measuring system. Calibration thereby refers to the determination of the actual value. The readjusting of the torque/angle wrench then takes place subsequently.

The calibration and readjusting can even take place in reverse direction. The torque/angle wrench can be replaced by a reference sensor and the torque sensor is calibrated by the reference sensor. Likewise, the rotation angle sensor can be calibrated by a reference sensor, which is mounted in the accommodation of the torque measuring system, e.g. for calibrating the actuating system once or at regular intervals.

The rotation angle measuring system can encompass a rotation angle actuator, so as to rotate the torque measuring system relative to the rotation angle measuring system. For example, the rotation angle actuator can comprise a servomotor, which introduces a rotary motion into the torque measuring sensor. Furthermore, the rotation angle measuring system can encompass a rotation angle sensor, by means of which the rotation of the torque measuring system by the rotation angle measuring system and in particular by the servomotor can be measured. Preferably, the rotation angle measuring system can be arranged so as to be stationary and the torque measuring system carries out the rotary motion. To accurately detect the rotary motion of the torque measuring system, the rotation angle sensor is necessary, which can be used as a reference so as to calibrate the device for electronically measuring the rotation angle of the torque/angle wrench. As a result, the device for electronically measuring the torque as well as the device for electronically measuring the rotation angle can be calibrated simultaneously in the torque/angle wrench and screw connections can be simulated without requiring a friction system, for example, for simultaneously creating a rotation in response to the application of a torque. The torque, which is introduced into the torque/angle wrench via the torque actuator, and the rotation, which is introduced into the torque/angle wrench via the rotation angle actuator, can take place independent from one another.

According to an advantageous embodiment of the actuating device, provision can be made between the torque measuring system and the rotation angle measuring system for a coupling arrangement, via which the torque measuring system can be connected to the rotation angle measuring system in the axis of rotation. The coupling arrangement can be embodied as a fixed actuator connection, or the coupling arrangement can be switched in such a manner that the torque measuring system can be rotated freely when the torque measuring system is decoupled from the rotation angle measuring system. With this, the manageability of the actuating device can be improved, for example. The rotation angle measuring system can be arranged so as to be stationary in the actuating device, so that only the torque measuring system is rotated by means of the torque/angle wrench.

As a particularly advantageous embodiment, the torque actuator can encompass a lever element, which is connected to the torque/angle wrench via the torque sensor and via the accommodation in the axis of rotation, wherein an actuator element for applying a torque about the axis of rotation is arranged on the end side of the lever element. The torque actuator does not need to overcome any rotation angles in particular, because it is integrated into the closed torque circuit of the torque measuring system. Only the mechanical resilience in the closed torque circuit, in particular the resilience of the torque/angle wrench due to its deflection, must be overcome by the torque actuator. In the event that the actuator element, for example a displaceable carriage of a spindle system, is arranged on the end side of the lever element, and in the event that it introduces a torque into the lever element, the lever arm can extend approximately in the same direction as the piston of the torque/angle wrench. Through this, the lever element as well as the piston of the torque/angle wrench can be oriented orthogonally to the axis of rotation.

The torque/angle wrench encompasses a device for electronically measuring a torque and in particular a device for electronically measuring a rotation angle. The device for electronically measuring the torque can be based on strain gauge strips and the device for electronically measuring the rotation angle is based on rotation angle measuring elements, which can measure rotation angles without a mechanical connection to stationary parts.

According to a further embodiment, the actuating device can encompass a control device, by means of which in particular at least the device for electronically measuring the torque and/or the device for electronically measuring the rotation angle of the torque/angle wrench and/or the rotation angle sensor and/or the rotation angle sensor of the torque system and/or the rotation angle sensor of the rotation angle measuring system is connected electrically. The control device can be formed by means of a PC and the components connected to the PC encompass corresponding interfaces, which can be embodied via cable connections or via wireless connections, for example via infrared or radio connections.

The control device and in particular the PC is embodied for controlling the torque actuator for introducing a torque into the torque/angle wrench in response to a simultaneous rotation of the torque measuring system for controlling the rotation angle actuator. Different methods are known, according to which a criterion for the tightening degree of a screw connection can be obtained. The screw connection can be tightened until a certain predetermined torque has been reached. The screw connection can also be tightened by a predetermined angle after exceeding a pre-torque.

The tightening of the screw connection can even be carried out to the elastic limit, that is, the point in which the end of Hooke's line is reached and a plastic deformation of the screw connection occurs. An empirically found pre-torque is thereby provided. This is the torque, at which the screw head bears flat on the surface of the workpiece, for example, after all unevenness has been flattened. Starting at this point, the incline of Hooke's line, that is, the derivation of the expansion of the screw, is determined according to the rotation angle. In the event that this derivation decreases by a certain percentage as compared to its maximum value, the elastic limit has been reached. This is one criterion for the optimal tightening of the screw connection.

The torque applied thereby increases initially up to a maximum, in which the static friction has been overcome. The torque then decreases again after overcoming the static friction. After reaching a maximum, the torque increases again in response to an increasing rotation angle. This maximum supplies the tightening torque of the tightened screw connection. In particular such a screw connection can be simulated by means of the control device.

The control device can simulate such process knowledge of screw connections, in that the actuators of the actuating device are controlled accordingly. Electronic torque/angle wrenches comprising a rotation angle detection are used in particular for controlling screw connections tightened in such a manner.

According to a further development of the actuating device according to the invention, the torque measuring system can be supported in an accommodation support. In particular, the torque measuring system can encompass a measuring table, which is supported so as to be pivotable in or on a table leg by means of the accommodation support. The measuring table can encompass a worktop and a movable accommodating drawer, which is arranged below the worktop, wherein a tool clamping device, in which the torque/angle wrench can be clamped in the area of the wrench grip, is preferably arranged on the worktop.

The embodiment of the actuating device according to the invention has the advantage as compared to the state of the art that a braking system is not necessary, the construction of which is typically 10 times more inaccurate and much more extensive. Friction losses do not occur, which in turn lead to heat development and the calibration of the torque/angle wrench cannot occur accurately. The measuring inaccuracy of the actuating device according to the invention, however, is limited exclusively by the measuring inaccuracy of the measuring sensors.

PREFERRED EMBODIMENT OF THE INVENTION

Further measures, which improve the invention, will be illustrated in more detail below together with the description of an exemplary embodiment of the invention by means of the figures.

Figure 2:
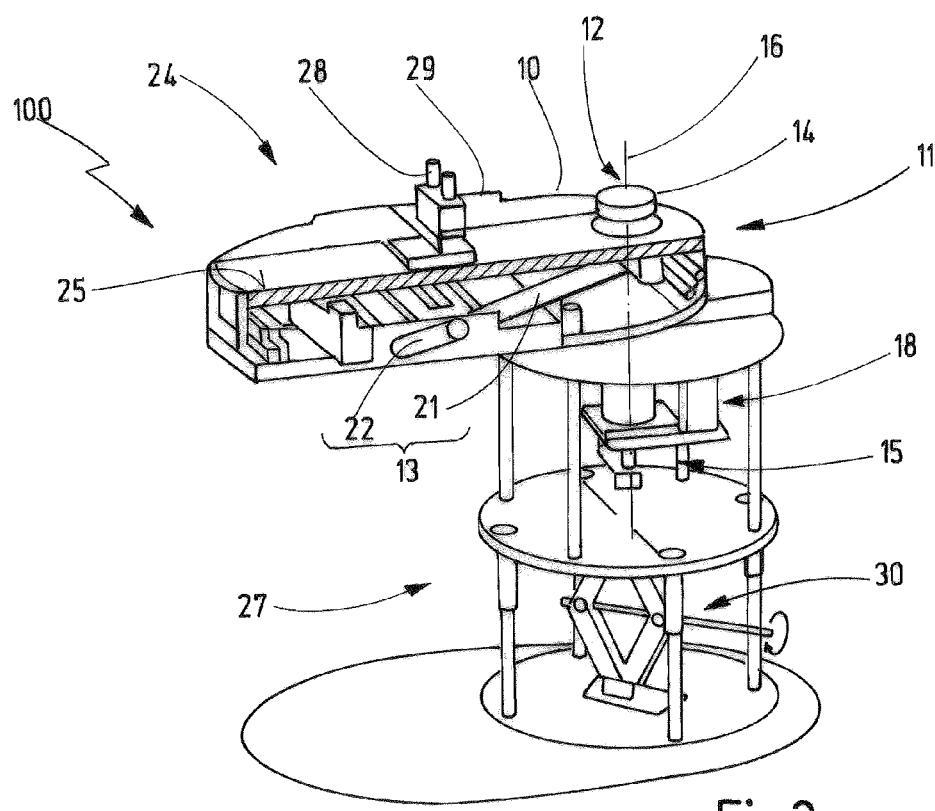
Figure 3:
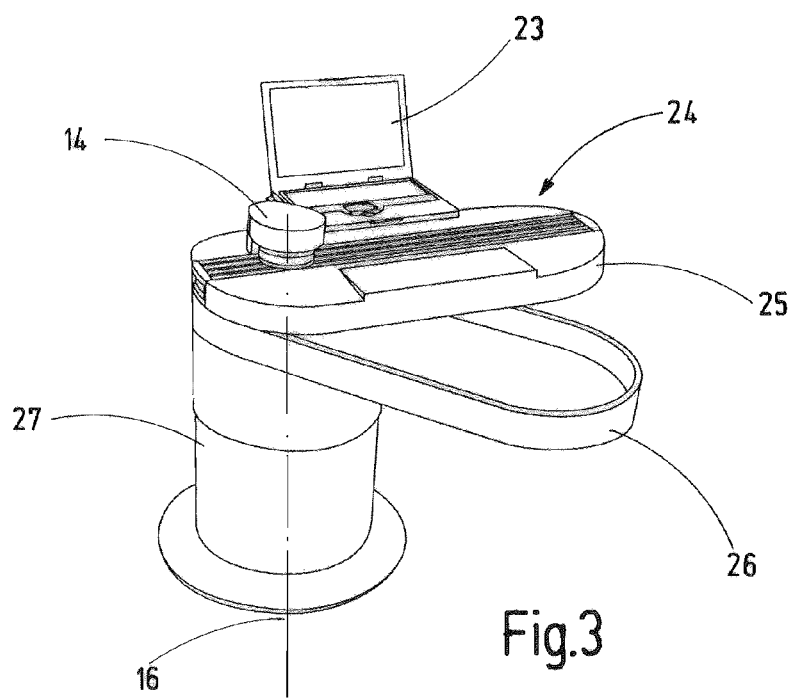

FIG. 1 shows a schematic illustration of an exemplary embodiment of an actuating device for calibrating torque/angle wrenches according to the instant invention, FIG. 2 shows a perspective view of an actuating device comprising the features of the instant invention and FIG. 3 shows a modified exemplary embodiment of an actuating device according to the instant invention.

In a schematic view, FIG. 1 shows an exemplary embodiment of an actuating device 100 comprising the features of the instant invention. The actuating device 100 serves to calibrate torque/angle wrenches 10, which encompass a device for measuring a torque and a device for measuring a rotation angle. The devices are embodied as electronic measuring devices. The actuating device 100 according to the invention encompasses two component assemblies and the first component assembly is formed by a torque measuring system 11, which is suggested by an upper dashed box. The second component assembly is formed by a rotation angle measuring system 15, which is suggested by a lower dashed box.

The torque measuring system 11 encompasses an accommodation 12 for accommodating the torque/angle wrench 10. The accommodation 12 can be embodied as a square accommodation, and the torque/angle wrench 10 is inserted into the accommodation 12 via a headpiece. The torque/angle wrench 10 is clamped in a stationary manner in the torque measuring system 11 via its piston in a manner, which is not illustrated in detail. The torque measuring system 11 further encompasses a torque actuator 13 for applying a torque to the torque/angle wrench 10, and the torque actuator 13 comprises, for example, a lever element 21 and an actuator element 22, and a torque about an axis of rotation 16 can be introduced into the torque/angle wrench 10 by means of the torque actuator 13.

The introduction of the torque into the torque/angle wrench 10 by means of the torque actuator 13 takes place via a torque sensor 14, which is arranged between the lever element 21 and the accommodation 12 for accommodating the torque/angle wrench 10. The torque introduced into the torque/angle wrench 10 can be measured by means of the torque sensor 14 and serves as reference for calibrating the device for measuring the torque in the torque/angle wrench 10.

The rotation angle measuring system 15 according to the invention encompasses a rotation angle actuator 18, which can be connected to the torque measuring system 11 via a coupling arrangement 20. The rotation angle actuator 18 can prompt the torque measuring system 11 as an entire component assembly to rotate about the axis of rotation 16. The rotation angle, which the torque measuring system 11 draws about the axis of rotation 16, is measured by means of a rotation angle sensor 19, which is a component of the rotation angle measuring system 15. This leads to the advantage that the torque actuator 13 for applying a torque in the torque/angle wrench 10 can be operated independent from the rotation angle actuator 18, by means of which the entire unit of the torque measuring system 11 and thus also the torque/angle wrench 10 can be rotated.

A control device 23 serves to control the actuators 13 and 18 as well as to read out the sensors 14, 17 and 19 as well as to record the values measured by means of the torque/angle wrench 10. The control device 23 can be used to control the actuators 13 and 18, in particular in such a manner that virtually any screw connection can be simulated. FIG. 2 shows a concrete exemplary embodiment of the actuating device 100 according to the invention in a perspective view.

FIG. 2 illustrates an exemplary embodiment of an actuating device 100 and the torque measuring system 11 forms a table-shaped upper part, which can be rotated about the axis of rotation 16 relative to a lower part, which is formed by means of a table leg 27, and into which the rotation angle measuring system 15 is introduced. The torque measuring system 11 has a measuring table 24, on which the torque/angle wrench 10 is accommodated via the accommodation 12 and the tool clamping device 28, which supports the torque/angle wrench 10 in the area of the wrench grip 29. The accommodation 12 is arranged in a torque sensor 14, by means of which the torque, which is introduced into the torque/angle wrench 10, can be measured.

By means of the cross sectioned view of the measuring table 24, the torque actuator 13 is visible, which encompasses a lever element 21, the one side of which is connected to the accommodation 12 in the axis of rotation 16 by means of the torque sensor 14, and which extends radially away from the axis of rotation 16 towards an actuator element 22. A lever moment can be introduced into the lever element 21 by means of the actuator element 22, in that the lever element 21 is tensioned in the direction of rotation about the axis of rotation 16. This torque is transferred directly into the accommodation 12 of the torque/angle wrench 10. The design of the measuring table 24 shows that a closed torque circuit is formed, at which the measuring table 24 as an accommodation component, the torque actuator 13 as a torque-generating means for applying the torque and the torque/angle wrench 10 are located. The unit of the torque measuring system 11, which is formed in this manner, can be pivoted about the axis of rotation 16 and is supported in the table leg 27 so as to be rotatable for this purpose.

The rotation angle measuring system 15 comprising the rotation angle actuator 18, which is embodied as a servomotor, and which can initiate a rotary motion into the torque measuring system 11 about the axis of rotation 16 via a belt drive is arranged below the rotatable support. The table leg 27 furthermore encompasses a height adjustment 30 for adjusting the working height of the measuring table 24.

FIG. 3 shows a modified exemplary embodiment of the actuating device 100, in which the measuring table 24 is embodied as a worktop 25, on which the torque sensor 14 is arranged. An accommodating drawer 26, in which small parts of the actuating device 100 can be supported, is shown below the worktop 25. The measuring table 24 comprising the worktop 25 as well as the accommodating drawer 26, in turn, are accommodated via a table leg 27, and the measuring table 24 as well as the accommodating drawer 26 can pivot about the axis of rotation 16. A PC, by means of which the sensors 14, 17 and 19 as well as the actuators 13 and 18 can be read out or controlled, respectively, is shown in an exemplary manner as control device 23. Data, which are detected by the torque/angle wrench 10, can be stored in the control device 23.

The invention claimed is:

1. An actuating device for calibrating torque/angle wrenches encompassing a torque measuring system, comprising:
   an accommodation for accommodating the torque/angle wrench,
   a torque actuator for applying a torque to the torque/angle wrench and
   a torque sensor for detecting the torque,
characterized in that provision is made for a rotation angle measuring system, which is embodied for rotating the torque measuring system in such a manner that a rotation of the torque/angle wrench about a rotation angle is measured in addition to the measuring of a torque in the torque/angle wrench.

2. The actuating device according to claim 1, characterized in that provision is made for an axis of rotation, about which the torque measuring system can be rotated.

3. The actuating device according to claim 1, characterized in that the torque measuring system encompasses a rotation angle sensor, by means of which the rotation of the torque measuring system is measured, wherein the torque/angle wrench is accommodated in a rotation-free manner with reference to the torque measuring system.

4. The actuating device according to claim 1, characterized in that the rotation angle measuring system encompasses a rotation angle actuator, so as to rotate the torque measuring system relative to the rotation angle measuring system.

5. The actuating device according to claim 4, characterized in that the rotation angle measuring system encompasses a rotation angle sensor, by means of which the rotation of the torque measuring system is measured by the rotation angle actuator.

6. The actuating device according to claim 2, characterized in that provision is made between the torque measuring system and the rotation angle measuring system for a coupling arrangement, via which the torque measuring system is connected to the rotation angle measuring system in the axis of rotation.

7. The actuating device according to claim 2, characterized in that the torque actuator encompasses a lever element, which is connected to the torque/angle wrench via the torque sensor and via the accommodation in the axis of rotation, wherein an actuator element for applying a torque about the axis of rotation is arranged on the end side of the lever element.

8. The actuating device according to claim 1, characterized in that the torque/angle wrench encompasses a device for electronically measuring a torque and a device for electronically measuring an angle of rotation.

9. The actuating device according to claim 8, characterized in that provision is made for a control device, by means of which at least the device for electronically measuring the torque or the device for electronically measuring the rotation angle of the torque/angle wrench or the rotation angle sensor or the rotation angle sensor of the torque measuring system or the rotation angle sensor of the rotation angle measuring sensor is connected electrically.

10. The actuating device according to claim 9, characterized in that, by controlling the torque actuator, the control device is embodied for introducing a torque into the torque/angle wrench in response to a simultaneous rotation of the torque measuring system by controlling the rotation angle actuator.

11. The actuating device according to claim 1, characterized in that the torque measuring system is supported in an accommodation support, wherein the torque measuring system encompasses a measuring table, which is supported in a table leg so as to be pivotable by means of the accommodation support.

* * * * *